(12) United States Patent
Kang et al.

(10) Patent No.: US 11,509,156 B2
(45) Date of Patent: Nov. 22, 2022

(54) APPARATUS AND METHOD FOR CHARGING BATTERY

(71) Applicant: Samsung Electronics Co., Ltd., Gyeonggi-do (KR)

(72) Inventors: Seongjoo Kang, Gyeonggi-do (KR); Hyunjun Shim, Gyeonggi-do (KR); Yongsang Yun, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 118 days.

(21) Appl. No.: 17/029,898

(22) Filed: Sep. 23, 2020

(65) Prior Publication Data

US 2021/0111577 A1 Apr. 15, 2021

(30) Foreign Application Priority Data

Oct. 11, 2019 (KR) .......................... 10-2019-0126420

(51) Int. Cl.
*H02J 7/00* (2006.01)

(52) U.S. Cl.
CPC ...... *H02J 7/00712* (2020.01); *H02J 7/00032* (2020.01); *H02J 7/0045* (2013.01); *H02J 7/0048* (2020.01); *H02J 2207/20* (2020.01)

(58) Field of Classification Search
CPC ....................................................... H02J 7/00
See application file for complete search history.

(56) References Cited

U.S. PATENT DOCUMENTS

| 5,420,496 A | 5/1995 | Ishikawa |
| 2007/0188134 A1 | 8/2007 | Hussain et al. |

| 2009/0001935 A1* | 1/2009 | Odaohhara ....... H02J 7/007182 320/134 |
| 2012/0139480 A1 | 6/2012 | Kaneko |
| 2014/0084854 A1 | 3/2014 | Eifuku |

(Continued)

FOREIGN PATENT DOCUMENTS

| JP | 2776105 | 7/1998 |
| KR | 100902522 | 6/2009 |

(Continued)

OTHER PUBLICATIONS

International Search Report dated Dec. 21, 2020 issued in counterpart application No. PCT/KR2020/012477, 3 pages.

*Primary Examiner* — Robert Grant
(74) *Attorney, Agent, or Firm* — The Farrell Law Firm, P.C.

(57) ABSTRACT

An electronic device is provided. The electronic device includes a battery, an interface configured to support a connection with an external power supply unit, a charging circuit configured to charge the battery with a power being supplied from the external power supply unit, and a processor configured to receive information on the supplied power of the external power supply unit from the external power supply unit, determine a voltage to be supplied from the external power supply unit based on supplied voltage information of the external power supply unit and status information of the battery, transmit information on the determined voltage to the external power supply unit, and charge the battery with the determined voltage. The determined voltage is a voltage determined so that a difference between an input voltage and an output voltage of the charging circuit is minimized.

17 Claims, 5 Drawing Sheets

(56) References Cited

U.S. PATENT DOCUMENTS

2015/0048795 A1    2/2015   Hashimoto
2017/0201107 A1    7/2017   Yang
2018/0145530 A1    5/2018   Lee et al.
2020/0220371 A1    7/2020   Lim et al.

FOREIGN PATENT DOCUMENTS

KR        101441134     9/2014
KR        101913711    10/2018
KR    1020180109610   10/2018
KR    1020190031653    3/2019
WO    WO2013161512   10/2013

\* cited by examiner

APPARATUS AND METHOD FOR CHARGING BATTERY

CROSS-REFERENCE TO RELATED APPLICATION(S)

This application is based on and claims priority under 35 U.S.C. § 119 to Korean Patent Application No. 10-2019-0126420 filed on Oct. 11, 2019, in the Korean Intellectual Property Office, the disclosure of which is incorporated herein by reference in its entirety.

BACKGROUND

1. Field

The present disclosure relates generally to an apparatus and a method for charging a battery.

2. Description of Related Art

Functions that can be provided by a portable electronic device, such as a smart phone, a tablet personal computer (PC), a laptop PC, or a wearable device, are gradually being increased. As the functions that can be provided by the portable electronic device are being increased, the time in which a user uses the portable electronic device is also gradually being increased.

In order for the user to use the portable electronic device for a long time, a battery having a large capacity is necessary, and a charging time is gradually being increased.

During battery charging, fast charging may be supported by increasing a charging voltage and decreasing current. However, in a circuit that converts a voltage being supplied from an external power supply unit into a battery charging voltage, a big difference between two voltages may cause the efficiency of the voltage conversion circuit to be lowered, and may cause heat generation of circuit parts to be increased. If a temperature of an electronic device is increased due to an increased amount of heat generation, a user may get burned, and the charging time may be increased through activation of a charging limit mode.

SUMMARY

The present disclosure has been made to address at least the disadvantages described above and to provide at least the advantages described below.

In accordance with an aspect of the present disclosure, an electronic device is provided. The electronic device includes a battery, an interface configured to support a connection with an external power supply unit, a charging circuit configured to charge the battery with a power being supplied from the external power supply unit, and a processor configured to receive information on the supplied power of the external power supply unit from the external power supply unit, determine the power to be supplied from the external power supply unit based on the information on the supplied power of the external power supply unit and status information of the battery, determine a voltage to be supplied from the external power supply unit corresponding to the determined power, transmit information on the determined voltage to the external power supply unit, and charge the battery with the determined voltage. The determined voltage is a voltage determined so that a difference between an input voltage and an output voltage of the charging circuit is minimized.

In accordance with an aspect of the present disclosure, an electronic device is provided. The electronic device includes a battery, an interface configured to support a connection with an external power supply unit, a charging circuit configured to charge the battery with a power being supplied from the external power supply unit, and a processor configured to receive information on the supplied power of the external power supply unit from the external power supply unit, determine a voltage to be supplied from the external power supply unit based on supplied voltage information of the external power supply unit and status information of the battery, transmit information on the determined voltage to the external power supply unit, and charge the battery with the determined voltage. The determined voltage is a voltage determined so that a difference between an input voltage and an output voltage of the charging circuit is minimized.

In accordance with an aspect of the present disclosure, a method for charging a battery of an electronic device is provided. The method includes receiving information on supplied power of an external power supply unit from the external power supply unit, determining a power to be supplied from the external power supply unit based on the information on the supplied power of the external power supply unit and status information of the battery, determining a voltage to be supplied from the external power supply unit corresponding to the determined power, transmitting information on the determined voltage to the external power supply unit, and charging the battery with the determined voltage. The determined voltage is a voltage having a minimum difference from a supplied voltage of the external power supply unit.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Hereinafter, various embodiments of the disclosure will be described with reference to the accompanying drawings.

Figure 1:
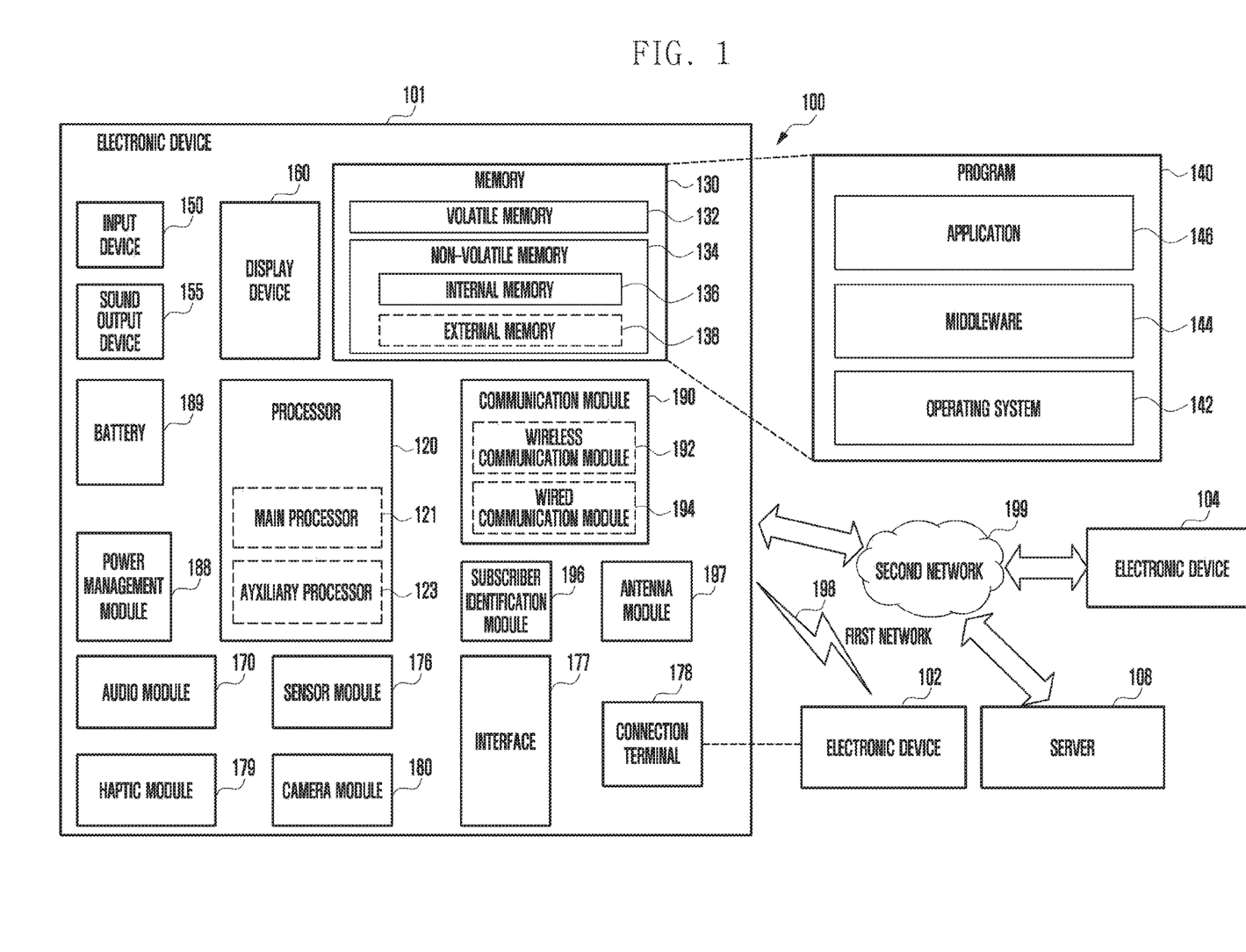
FIG. 1 is a block diagram of an electronic device in a network environment, according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor (e.g., an iISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GLASS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIDI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Figure 2:
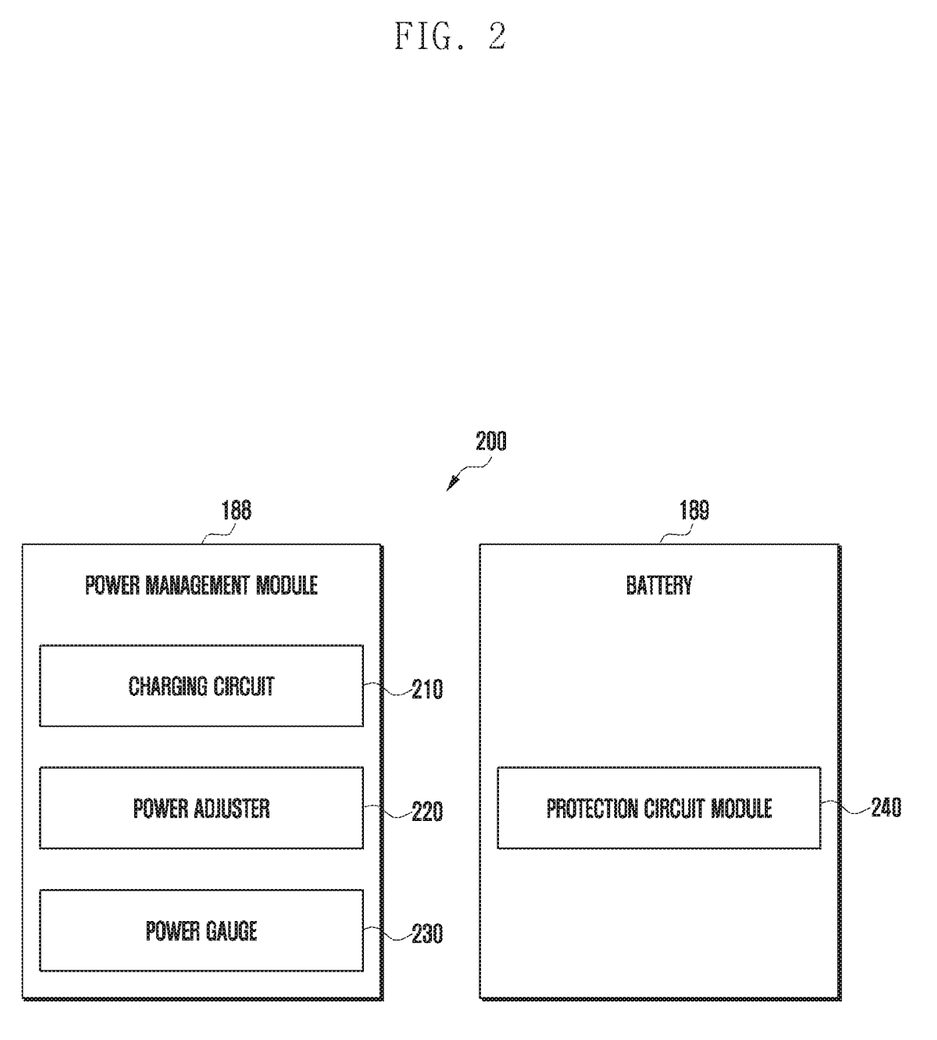
FIG. 2 is a block diagram of a power management module and a battery, according to an embodiment.

FIG. 2 is a block diagram 200 illustrating the power management module 188 and the battery 189, according to an embodiment. Referring to FIG. 2, the power management module 188 may include charging circuitry 210, a power adjuster 220, or a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

Figure 3:
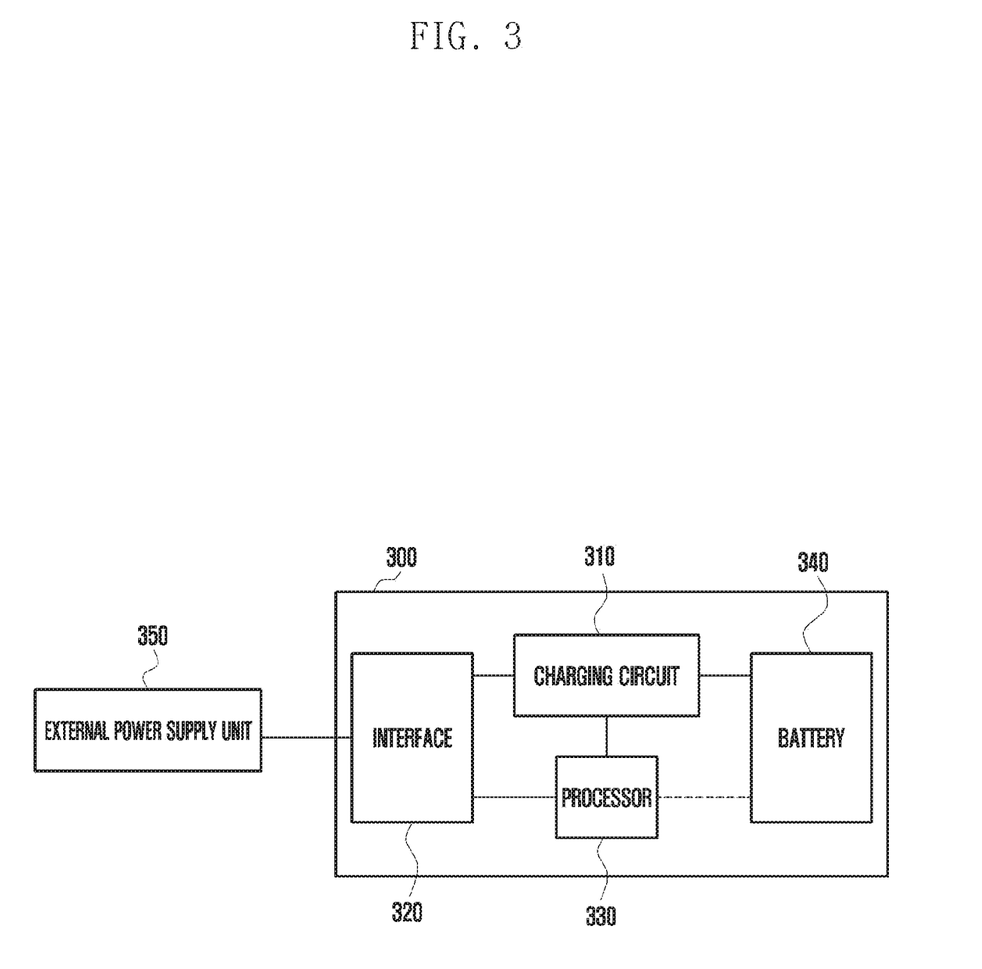
FIG. 3 is a diagram illustrating a partial configuration of an electronic device charging an internal battery, according to an embodiment.

FIG. 3 is a diagram illustrating a partial configuration of an electronic device charging an internal battery, according to an embodiment.

An electronic device 300 may include a charging circuit 310, an interface 320, a processor 330, and a battery 340.

The charging circuit 310 may charge the battery 340 using a power and/or a voltage being supplied from an external power supply unit 350. The charging circuit 310 may convert the voltage supplied from the external power supply unit 350 (e.g., charger) into a voltage to charge the battery 340. The charging circuit 310 may include a buck converter, a boost converter, and a buck-boost converter to convert the voltage. The electronic device 300 may receive the power being supplied from the external power supply unit through the interface, and may determine a charging mode or/and a kind of converter based on an input voltage of the received power. The buck converter is a converter being used in case that a voltage lower than the input voltage is necessary, and the buck converter may be selected in case that the voltage that can be supplied by the external power supply unit 350 is higher than the voltage to charge the battery 340. The boost converter is a converter being used in case that a voltage higher than the input voltage is necessary, and the boost converter may be selected in case that the voltage that can be supplied by the external power supply unit 350 is lower than the voltage to charge the battery 340. The buck-boost converter may be used in case that a voltage that is higher than or lower than the input voltage is necessary.

The charging circuit 310 may select any one of the buck converter, the boost converter, and the buck-boost converter in accordance with the voltage to be supplied from the external power supply unit determined by the processor 330.

The interface 320 may be connected to the external power supply unit 350, and may receive information on the power that can be supplied from the external power supply unit 350. The interface 320 may also receive the information on the power that can be supplied by the external power supply unit 350 or information on the voltage. The information on the voltage that can be supplied may be a plurality of voltages that can be selected by the electronic device 300 or a voltage in a predetermined range.

The interface 320 may transmit information on the power and the voltage to be supplied from the external power supply unit 350 determined by the processor 330 to the external power supply unit 350. The processor 330 may control to transmit the information on the power or the voltage to be supplied from the external power supply unit 350 to the external power supply unit 350 using the interface 320.

The processor 330 may determine the power and/or the voltage to be supplied from the external power supply unit 350 based on the information on the power and/or the voltage that can be supplied by the external power supply unit 350 received through the interface 320. The processor 330 may first identify a charge residual quantity of the battery 340 and/or the voltage of the battery 340 before determining the power to be supplied from the external power supply unit 350. The processor 330 may determine the power to be supplied from the external power supply unit 350 in further consideration of the charge residual quantity of the battery 340 and/or the voltage of the battery 340. The voltage of the battery 340 may be a voltage value between both ends of the battery 340. The processor 330 may determine the voltage or current to be supplied from the external power supply unit 350 based on the voltage of the battery 340.

The processor 330 may determine at least one of the power and the voltage to be supplied from the external power supply unit 350 in consideration of at least one of information on the power, voltage, and current of the external power supply unit 350, the kind of the external power supply unit 350, status information of the battery 340, information on charging of the battery 340, and information on a cable connecting the external power supply unit 350 and the electronic device 300 to each other. The information on the power, voltage, and current of the external power supply unit 350 may include at least one of the power, voltage, and current that can be supplied by the external power supply unit 350 and power, voltage, and current threshold values that can be supplied by the external power supply unit 350.

The processor 330 may determine the highest power to be able to charge the battery 340 among powers that can be supplied by the external power supply unit 350 as a power to be supplied from the external power supply unit 350. If the external power supply unit 350 can supply 15 Watts (W), 25 W, and 30 W as shown in Table 1, and the battery 340 can be maximally charged with 25 W, the processor 330 may select 25 W as the power to be supplied from the external power supply unit 350. If the external power supply unit 350 can supply 15 W, 25 W, and 30 W, and the battery 340 can be maximally charged with 40 W, the processor 330 may select 30 W as the power to be supplied from the external power supply unit 350.

TABLE 1

| Charging Power | 15 W | 25 W | 30 W |
| --- | --- | --- | --- |

If the power to be supplied from the external power supply unit 350 is determined, the processor 330 may determine the voltage to be supplied from the external power supply unit 350 corresponding to the determined power.

The processor 330 may determine the voltage to be supplied from the external power supply unit 350. Because the processor 330 may determine the voltage to be supplied from the external power supply unit 350, and the current may be determined by the charging circuit 310 of the electronic device 300, the power to be supplied from the external power supply unit 350 may also be determined.

The processor 330 may determine the voltage to be supplied from the external power supply unit 350, and the charging circuit 310 may determine the necessary current to charge the battery 340. The processor 330 may transmit information on the voltage to the external power supply unit 350 so that the external power supply unit 350 can output the determined voltage. The charging circuit 310 may receive the current and/or the power that is necessary to charge the battery from the external power supply unit 350 outputting the determined voltage.

The external power supply unit 350 may supply different voltages by powers that can be supplied. Table 2 shows that the external power supply unit 350 may supply the power of 15 W using one of 9 Volts (V), 12V, and 15V. Even if the external power supply unit 350 supplies the same power, converters being used to convert the voltages in the charging circuit 310 may differ as the voltages differ.

The converters being used may differ in accordance with a difference between the voltage of the battery 340 and the voltage being supplied from the external power supply unit 350. If the converters differ, the charging efficiencies and/or the amounts of heat generation may also differ. The charging efficiency of the boost converter may be lower than the charging efficiency of the buck converter. Even if the same power is supplied from the external power supply unit 350, the charging circuit 310 may select the buck converter to increase the charging efficiency.

With reference to Table 2, if a voltage of 9V is supplied from the external power supply unit 350, the charging circuit 310 may convert the supplied voltage into a voltage to charge the battery 340 using the buck-boost converter, and if a voltage of 12V or 15V is supplied from the external power supply unit 350, the charging circuit 310 may convert the supplied voltage into a voltage to charge the battery 340 using the buck converter.

TABLE 2

| | | | |
|---|---|---|---|
| Voltage of external power supply unit | 9 V | 12 V | 15 V |
| Current of external power supply unit | 1.67 A | 1.25 A | 1 A |
| Charging power | 15 W | 15 W | 15 W |
| Kind of converter being used | Buck-Boost | Buck | Buck |

TABLE 2-continued

| | | | |
|---|---|---|---|
| Efficiency | 90.9% | 94.4% | 91.7% |
| Temperature of inductor in converter | 51.5° C. | 43.1° C. | 54.6° C. |

Table 3 shows that the external power supply unit 350 may supply the power of 30 W using one of 5V, 9V, 12V, 15V, and 20V. In the same manner as Table 2, even if the external power supply unit 350 supplies the same power, the converters being used to convert the voltages in the charging circuit 310 may differ as the voltages differ. With reference to Table 3, if a voltage of 5V is supplied from the external power supply unit 350, the charging circuit 310 may convert the supplied voltage into a voltage to charge the battery 340 using the boost converter, and if a voltage of 20V is supplied from the external power supply unit 350, the charging circuit 310 may convert the supplied voltage into a voltage to charge the battery 340 using the buck converter.

TABLE 3

| | | | | | |
|---|---|---|---|---|---|
| Voltage of external power supply unit | 5 V | 9 V | 12 V | 15 V | 20 V |
| Current of external power supply unit | 6 A | 3.3 A | 2.5 A | 2 A | 1.5 A |
| Charging power | 30 W | 30 W | 30 W | 30 W | 30 W |
| Kind of converter being used | Boost | Buck-Boost | Buck | Buck | Buck |
| Efficiency | 87.19% | 89.79% | 95.37% | 94.29% | 92.40% |
| Temperature of inductor in converter | 110.5° C. | 102.1° C. | 57.5° C. | 71.6° C. | 93.6° C. |

As shown in Table 2 and Table 3, even if the external power supply unit 350 supplies the same power, the charging circuit 310 of the electronic device 300 may differently select the kind of converter as the voltage being supplied differs.

If the kind of converter differs, the charging efficiency and the temperature of an inductor in the converter may also differ.

The voltage to charge the battery 340 may exert an influence on at least one of the kind of converter in the charging circuit 310, the charging efficiency, and the temperature of an inductor in the converter.

The processor 330 may determine the voltage to charge the battery 340. The processor 330 may determine the voltage having the minimum difference from the voltage capable of being input from the external power supply unit 350 as the voltage to charge the battery 340. The processor 330 may determine the voltage having the minimum difference from the voltage capable of being input from the external power supply unit 350 among the voltages capable of being converted using the buck converter as the voltage to charge the battery 340. Further, the processor 330 may determine the lowest voltage among the voltages capable of being converted using the buck converter as the voltage to charge the battery 340.

If the voltage to be supplied from the external power supply unit 350 is determined, the processor 330 may select the converter to convert the voltage of the charging circuit 310. If the voltage to be supplied from the external power supply unit 350 is a voltage that can be converted by the buck converter of the charging circuit 310, the processor 330 may select the buck converter.

The processor 330 may select the voltage of the power received from the external power supply unit 350 as the voltage capable of being converted by the charging circuit 310 using the buck converter. The processor 330 may select the voltage which is higher than the voltage of the battery 340 among the voltages capable of being supplied by the external power supply unit 350 and which has the minimum difference.

The processor 330 may determine the voltage to charge the battery 340 in further consideration of the status information of the battery 340. The status information of the battery 340 may include information on the charge residual quantity of the battery 340 or/and the voltage of the battery 340.

The battery 340 may be connected to the charging circuit 310 to be charged with the power. The battery 340 may have a predetermined chargeable capacity. A plurality of batteries 340 (e.g., two or three batteries) connected in series with each other may be included in the electronic device 300.

The external power supply unit 350 may be a unit to supply the power to the electronic device 300. The external power supply unit 350 may be any one of an external power such as a power adaptor, an external battery of the electronic device 300, such as a built-out battery, and an external electronic device. The external power supply unit 350 may be a wireless external power supply unit.

The external power supply unit 350 and the electronic device 300 may be connected to each other through a USB cable. The external power supply unit 350 may be connected to the electronic device 300, and may support fast charging of the battery 340.

The external power supply unit 350 may supply the same power to the electronic device 300 with different voltages. For this, the external power supply unit 350 may transmit, to the electronic device 300, information on powers capable of being supplied and information on voltages capable of supplying the corresponding powers. The external power supply unit 350 may transmit 15 W, 25 W, and 30 W as information on the powers capable of being supplied. Further, the external power supply unit 350 may transmit 5V, 9V, or 12V together or successively as the voltages capable of supplying the power of 15 W. The external power supply unit 350 may transmit a range of voltages capable of supplying the corresponding power. The external power supply unit 350 may transmit a voltage range of 3.2V to 20V as the voltages capable of supplying the power of 15 W.

Figure 4:
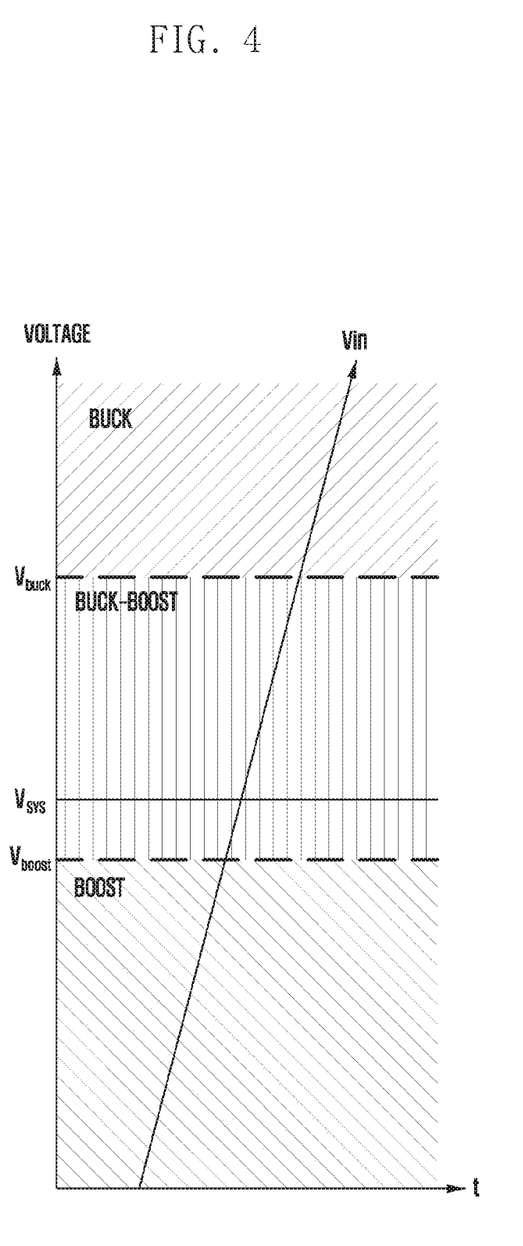
FIG. 4 is a diagram illustrating a converter in a charging circuit selected in accordance with status information of a battery, according to an embodiment.

FIG. 4 is a diagram illustrating a converter in a charging circuit selected in accordance with status information of a battery, according to an embodiment.

The status information of the battery may include information on the charge residual quantity of the battery and battery voltages. FIG. 4 illustrates that the processor of the electronic device considers the voltages of the battery as an example of the status information of the battery in selecting the converter in the charging circuit.

The processor 330 of the electronic device may pre-configure the voltages (e.g., $V_{boost}$ and $V_{buck}$) of the battery as references to configure the converter. The voltage of the battery that becomes the reference to configure the converter may be configured as a ratio ($V_{in}/V_{bat}$) of the voltage input to the battery to the voltage of the battery. The voltage $V_{boost}$ of the battery that becomes the reference in order for the processor 330 to change the configuration from the boost converter to the buck-boost converter may be a voltage value whereby the ratio ($V_{in}/V_{bat}$) of the voltage input to the battery to the voltage of the battery becomes 94%. The voltage $V_{buck}$ of the battery that becomes the reference in order for the processor 330 to change the configuration from the buck-boost converter to the buck converter may be a voltage value whereby the ratio ($V_{in}/V_{bat}$) of the voltage input to the battery to the voltage of the battery becomes 120%.

The voltage of the battery that becomes the reference in order for the processor 330 of the electronic device to configure the converter may differ depending on the maximum voltage of the battery. If a plurality of batteries are connected in series with each other, the voltage of the battery that becomes the reference to configure the converter may be overall increased.

With reference to FIG. 4, if the voltage of the battery is lower than $V_{boost}$, the processor 330 of the electronic device may select the boost converter in the charging circuit for the fast charging. Thereafter, if the voltage of the battery becomes higher than $V_{boost}$ with the lapse of time, the processor 330 may switch the selection from the boost converter to the buck-boost converter.

The processor 330 may identify the voltage of the battery 340 at regular intervals. If the voltage of the battery 340 becomes higher than $V_{buck}$, the processor may switch the selection from the buck-boost converter to the buck converter.

Figure 5:
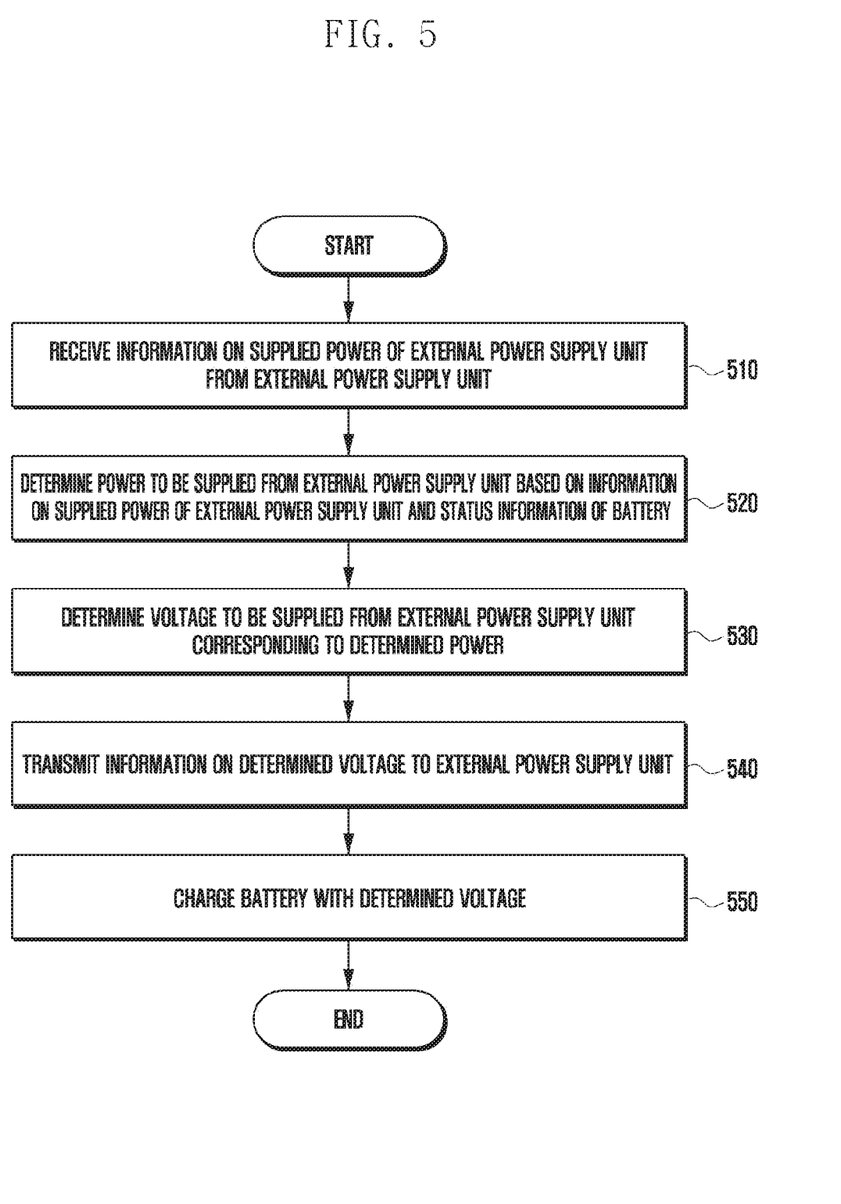
FIG. 5 is a flowchart illustrating that an electronic device charges an internal battery, according to an embodiment.

FIG. 5 is a flowchart illustrating that an electronic device charges an internal battery, according to an embodiment.

At step 510, if the electronic device is connected to the external power supply unit, the electronic device may receive the information on the power capable of being supplied by the external power supply unit 350 from the external power supply unit 350. Information on the power capable of being supplied by the external power supply unit 350 may include at least one of information on the power, voltage, and current of the external power supply unit 350, the kind of the external power supply unit 350, and information on a cable connecting the external power supply unit 350 and the electronic device 300 to each other. The information on the power, voltage, and current of the external power supply unit 350 may include at least one of the power, voltage, and current capable of being supplied by the external power supply unit 350 and power, voltage, and current threshold values capable of being supplied by the external power supply unit 350. The external power supply unit 350 may notify the electronic device 300 that the external power supply unit 350 can supply one power of 15 W, 25 W, or 30 W.

At step 520, the electronic device 300 may determine the power to charge the battery 340 based on the received information on the power or/and the voltage capable of being supplied by the external power supply unit and the status of the battery.

The electronic device 300 may determine the maximum power that can be accommodated by the charging circuit and the battery as the power to be supplied from the external power supply unit 350.

The electronic device 300 may determine the power to be supplied from the external power supply unit 350 in further consideration of the status information of the battery. The status information of the battery may include information on the charge residual quantity of the battery and/or the voltage of the battery. The electronic device 300 may determine the power to be supplied from the external power supply unit 350 based on the status information of the battery. If the charge residual quantity of the battery is small, or the voltage of the battery is low, the electronic device 300 may select a high power as the power to be supplied from the external power supply unit 350, whereas if the charge residual quantity of the battery is large, or the voltage of the battery is high, the electronic device 300 may select a low power as the power to be supplied from the external power supply unit 350

At step 530, the electronic device 300 may determine the voltage to be supplied from the external power supply unit 350 corresponding to the determined power. If the power to be supplied from the external power supply unit 350 is determined, the electronic device 300 may determine the voltage to be supplied from the external power supply unit 350 corresponding to this. The external power supply unit 350 may supply different voltages even if it supplies the same power. As described above with reference to FIG. 3, the converters in the charging circuit 310, the charging efficiency, and the temperature of the electronic device 300 may differ depending on the voltage to be supplied from the external power supply unit 350.

The electronic device 300 may determine the voltage having the minimum difference from the voltage capable of being input from the external power supply unit 350 as the voltage to charge the battery 340. The electronic device 300 may determine the voltage which is higher than the voltage of the battery and which has the minimum difference from the voltage capable of being input from the external power supply unit 350 as the voltage to charge the battery 340. Further, as the difference between the input voltage and the output voltage of the charging circuit 310 becomes small, the charging efficiency may be improved.

The electronic device 300 may determine the voltage having the minimum difference from the voltage that can be input from the external power supply unit 350 among the voltages that can be converted using the buck converter as the voltage to be supplied from the external power supply unit 350.

The electronic device 300 may determine the lowest voltage among the voltages that can be converted using the buck converter as the voltage to be supplied from the external power supply device 350.

At step 540, the electronic device 300 may transmit the information on the determined voltage to the external power supply unit 350.

At step 550, the electronic device 300 may charge the battery 340 with the determined voltage. The voltage supplied from the external power supply unit 350 may be charged in the battery 340 through the converter of the charging circuit 310.

The electronic device 300 may re-identify the status information of the battery 340 after a predetermined time elapses. If the predetermined time elapses after the charging, the charge residual quantity of the battery 340 and/or the voltage of the battery 340 may differ. Even if the predetermined time elapses after the charging, the charge residual quantity of the battery 340 and/or the voltage of the battery 340 may differ for each battery, and may differ depending on the kind of the battery, the expiration date, and the number of times of charging.

The electronic device 300 may re-determine the power to be supplied from the external power supply unit 350 based on the information on the power capable of being supplied by the external power supply unit 350, having been received at step 510, and the re-identified status information of the battery.

The electronic device 300 may re-determine the voltage to be supplied from the external power supply unit 350 as at step 530 corresponding to the re-determined power.

The electronic device 300 may transmit the re-determined voltage to be charged to the external power supply unit 350.

The electronic device 300 may continue the charging of the battery 340 with the re-determined voltage. The voltage supplied from the external power supply unit 350 may be charged in the battery 340 through the converter of the charging circuit 310.

An electronic device according to an embodiment may include a battery, an interface configured to support a connection with an external power supply unit, a charging circuit configured to charge the battery with a power being supplied from the external power supply unit, and a processor configured to receive information on the supplied power of the external power supply unit from the external power supply unit, determine the power to be supplied from the external power supply unit based on the information on the supplied power of the external power supply unit and status information of the battery, determine a voltage to be supplied from the external power supply unit corresponding to the determined power, transmit information on the determined voltage to the external power supply unit, and charge the battery with the determined voltage. The determined voltage is a voltage determined so that a difference between an input voltage and an output voltage of the charging circuit is minimized.

In the electronic device, the charging circuit may convert the voltage supplied from the external power supply unit into the determined voltage using one of a buck converter, a boost converter, or a buck-boost converter.

In the electronic device, the charging circuit may convert the voltage supplied from the external power supply unit into the determined voltage using one of a buck converter, a boost converter, or a buck-boost converter based on the status information of the battery.

In the electronic device, the charging circuit may output the determined voltage using a buck converter.

In the electronic device, the determined voltage may be a minimum voltage capable of being generated using a buck converter.

In the electronic device, the processor may determine the voltage to be supplied in further consideration of at least one of a cable connecting the electronic device and the external power supply unit to each other, a kind of the external power supply unit, the charging circuit, and a supplied current threshold value of the external power supply unit.

In the electronic device, the status information of the battery may be status information related to a charge residual quantity of the battery.

In the electronic device, the processor may identify the status information of the battery after a predetermined time elapses, re-determine the power to be supplied from the external power supply unit based on the information on the supplied power of the external power supply unit and the identified status information of the battery, re-determine the voltage to be supplied from the external power supply unit corresponding to the re-determined power, transmit information on the re-determined voltage to the external power supply unit, and charge the battery with the re-determined voltage.

In the electronic device according to various embodiments of the disclosure, the power to be supplied to charge the battery may be a highest power to be able to charge the battery among powers that can be supplied by the external power supply unit.

In the electronic device, the determined voltage may be a voltage configured to have a highest charging efficiency.

An electronic device according to an embodiment may include a battery, an interface configured to support a connection with an external power supply unit, a charging circuit configured to charge the battery with a power being supplied from the external power supply unit, and a processor configured to receive information on the supplied power of the external power supply unit from the external power supply unit, determine a voltage to be supplied from the external power supply unit based on supplied voltage information of the external power supply unit and status information of the battery, transmit information on the determined voltage to the external power supply unit, and charge the battery with the determined voltage. The determined voltage is a voltage determined so that a difference between an input voltage and an output voltage of the charging circuit is minimized.

In the electronic device, the charging circuit may include a plurality of converters, and the processor may select any one of the plurality of converters included in the charging circuit so that the difference between the input voltage and the output voltage of the charging circuit is minimized.

A method for operating an electronic device according to an embodiment may include receiving information on supplied power of an external power supply unit from the external power supply unit, determining a power to be supplied from the external power supply unit based on the information on the supplied power of the external power supply unit and status information of the battery, determining a voltage to be supplied from the external power supply unit corresponding to the determined power, transmitting information on the determined voltage to the external power supply unit, and charging the battery with the determined voltage. The determined voltage is a voltage having a minimum difference from a supplied voltage of the external power supply unit.

In the method for operating the electronic device, the determined voltage may be a voltage obtained by converting the voltage supplied from the external power supply unit using one of a buck converter, a boost converter, or a buck-boost converter.

In the method for operating the electronic device, the determined voltage may be a voltage obtained by converting the voltage supplied from the external power supply unit using one of a buck converter, a boost converter, or a buck-boost converter based on the status information of the battery.

In the method for operating the electronic device, the determined voltage may be a voltage converted using a buck converter.

In the method for operating the electronic device, determining the voltage to be charged may include determining the voltage to be charged in further consideration of at least one of a cable connecting the electronic device and the external power supply unit to each other, a kind of the external power supply unit, the charging circuit, and a supplied current threshold value of the external power supply unit.

In the method for operating the electronic device, the status information of the battery may be status information related to a charge residual quantity of the battery.

The method for operating the electronic device may further include identifying the status information of the battery after a predetermined time elapses, re-determining the power to be supplied from the external power supply unit based on the information on output information of the external power supply unit and the identified status information of the battery, re-determining the voltage to be supplied from the external power supply unit corresponding to the re-determined power, transmitting information on the re-determined voltage to the external power supply unit, and charging the battery with the re-determined voltage.

In the method for operating the electronic device, determining the power to be supplied to charge the battery may include determining the power to charge the battery as a highest power to be able to charge the battery among powers that can be supplied by the external power supply unit.

Other various embodiments are possible.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An electronic device comprising:
   a battery;
   an interface configured to support a connection with an external power supply unit;
   a charging circuit configured to charge the battery with a power being supplied from the external power supply unit; and
   a processor configured to:
     receive information on the supplied power of the external power supply unit from the external power supply unit,
     determine the power to be supplied from the external power supply unit based on the information on the supplied power of the external power supply unit and status information of the battery,
     determine a voltage to be supplied from the external power supply unit corresponding to the determined power,
     transmit information on the determined voltage to the external power supply unit, and
     charge the battery with the determined voltage,
   wherein the determined voltage is a voltage determined so that a difference between an input voltage and an output voltage of the charging circuit is minimized, and
   wherein the processor is further configured to determine the voltage to be supplied in further consideration of at least one of a cable connecting the electronic device and the external power supply unit to each other, a kind of the external power supply unit, the charging circuit, and a supplied current threshold value of the external power supply unit.

2. The electronic device of claim 1, wherein the charging circuit is configured to convert the voltage supplied from the external power supply unit into the determined voltage using one of a buck converter, a boost converter, or a buck-boost converter.

3. The electronic device of claim 2, wherein the charging circuit is configured to convert the voltage supplied from the external power supply unit into the determined voltage using one of a buck converter, a boost converter, or a buck-boost converter based on the status information of the battery.

4. The electronic device of claim 1, wherein the charging circuit is configured to output the determined voltage using a buck converter.

5. The electronic device of claim 4, wherein the determined voltage is a minimum voltage capable of being generated using a buck converter.

6. The electronic device of claim 1, wherein the status information of the battery is status information related to a charge residual quantity of the battery.

7. The electronic device of claim 1, wherein the processor is further configured to:
   identify the status information of the battery after a predetermined time elapses,
   re-determine the power to be supplied from the external power supply unit based on the information on the supplied power of the external power supply unit and the identified status information of the battery,
   re-determine the voltage to be supplied from the external power supply unit corresponding to the re-determined power,
   transmit information on the re-determined voltage to the external power supply unit, and
   charge the battery with the re-determined voltage.

8. The electronic device of claim 1, wherein the power being supplied to charge the battery is a highest power to be able to charge the battery among powers that can be supplied by the external power supply unit.

9. The electronic device of claim 1, wherein the determined voltage is a voltage configured to have a highest charging efficiency.

10. An electronic device comprising:
    a battery;
    an interface configured to support a connection with an external power supply unit;
    a charging circuit configured to charge the battery with a power being supplied from the external power supply unit; and
    a processor configured to:
      receive information on the supplied power of the external power supply unit from the external power supply unit,
      determine a voltage to be supplied from the external power supply unit based on supplied voltage information of the external power supply unit and status information of the battery,
      transmit information on the determined voltage to the external power supply unit, and
      charge the battery with the determined voltage,
    wherein the determined voltage is a voltage determined so that a difference between an input voltage and an output voltage of the charging circuit is minimize, and
    wherein the charging circuit comprises a plurality of converters, and wherein the processor is further configured to select one of the plurality of converters included in the charging circuit so that the difference between the input voltage and the output voltage of the charging circuit is minimized.

11. A method for charging a battery of an electronic device, the method comprising:

receiving information on supplied power of an external power supply unit from the external power supply unit;

determining a power to be supplied from the external power supply unit based on the information on the supplied power of the external power supply unit and status information of the battery;

determining a voltage to be supplied from the external power supply unit corresponding to the determined power;

transmitting information on the determined voltage to the external power supply unit; and charging the battery with the determined voltage, wherein the determined voltage is a voltage having a minimum difference from a supplied voltage of the external power supply unit, and wherein determining the voltage to be supplied comprises determining the voltage to be supplied in further consideration of at least one of a cable connecting the electronic device and the external power supply unit to each other, a kind of the external power supply unit, the charging circuit, and a supplied current threshold value of the external power supply.

12. The method of claim 11, wherein the determined voltage is a voltage obtained by converting the voltage supplied from the external power supply unit using one of a buck converter, a boost converter, or a buck-boost converter.

13. The method of claim 11, wherein the determined voltage is a voltage obtained by converting the voltage supplied from the external power supply unit using one of a buck converter, a boost converter, or a buck-boost converter based on the status information of the battery.

14. The method of claim 11, wherein the determined voltage is a voltage converted using a buck converter.

15. The method of claim 11, wherein the status information of the battery is status information related to a charge residual quantity of the battery.

16. The method of claim 11, further comprising:

identifying the status information of the battery after a predetermined time elapses;

re-determining the power to be supplied from the external power supply unit based on the information on output information of the external power supply unit and the identified status information of the battery;

re-determining the voltage to be supplied from the external power supply unit corresponding to the re-determined power;

transmitting information on the re-determined voltage to the external power supply unit; and charging the battery with the re-determined voltage.

17. The method of claim 11, wherein determining the power to be supplied to charge the battery comprises determining the power to be supplied to charge the battery as a highest power to be able to charge the battery among powers that can be supplied by the external power supply unit.

* * * * *